(12) United States Patent
Wygnanski

(10) Patent No.: US 9,046,187 B2
(45) Date of Patent: Jun. 2, 2015

(54) ELECTROMAGNETICALLY OPERATED SWITCHING DEVICES AND METHODS OF ACTUATION THEREOF

(75) Inventor: Wladyslaw Wygnanski, Cambridgeshire (GB)

(73) Assignee: Camcon Oil Limited, Cambridgeshire (GB)

( * ) Notice: Subject to any disclaimer, the term of this patent is extended or adjusted under 35 U.S.C. 154(b) by 218 days.

(21) Appl. No.: 13/643,813

(22) PCT Filed: May 3, 2011

(86) PCT No.: PCT/GB2011/050863
§ 371 (c)(1),
(2), (4) Date: Nov. 27, 2012

(87) PCT Pub. No.: WO2011/138599
PCT Pub. Date: Nov. 10, 2011

(65) Prior Publication Data
US 2013/0087726 A1    Apr. 11, 2013

(30) Foreign Application Priority Data

May 5, 2010   (GB) .................................. 1007458.1
Feb. 11, 2011  (GB) .................................. 1102452.8

(51) Int. Cl.
*F16K 11/052*   (2006.01)
*F16K 31/08*    (2006.01)
*F16K 31/06*    (2006.01)

(52) U.S. Cl.
CPC ............. *F16K 31/06* (2013.01); *F16K 31/0682* (2013.01); *F16K 31/082* (2013.01)

(58) Field of Classification Search
CPC .... F16K 31/06; F16K 31/0682; F16K 31/082
USPC ............ 137/625.4, 625.44, 625.66, 607, 862; 251/65, 129.2
See application file for complete search history.

(56) References Cited

U.S. PATENT DOCUMENTS 3,215,162 A * 11/1965 Carver ...................... 137/625.44
3,379,214 A *  4/1968 Weinberg ................... 137/625.5
(Continued)

FOREIGN PATENT DOCUMENTS

DE    2 345 638 B1   6/1974
DE    28 26 212 A1   3/1979
(Continued)

OTHER PUBLICATIONS

Espacenet, English Machine Translation of German Application No. DE2345638B1, published on Jun. 20, 1974, retrieved from http://worldwide.espacenet.com on Oct. 17, 2012 (7 pages).
(Continued)

*Primary Examiner* — Marina Tietjen
*Assistant Examiner* — Seth W Mackay-Smith
(74) *Attorney, Agent, or Firm* — Wood, Herron & Evans, LLP

(57) ABSTRACT

An electromagnetically operated switching device comprises an armature (82,102) having a magnetisable and moveable portion (82b,102b) for displacement between two stable rest positions. Two pole pieces (60,62) are disposed on opposite sides of the armature. The pole pieces form poles of opposing polarity adjacent to the armature, and the armature is magnetically attracted to a respective pole piece in each of its stable rest positions. A coil (54) is arranged to polarise the moveable portion of the armature when the coil is energised, such that the moveable portion of the armature is displaced from one stable rest position to the other by energising the coil so as to polarise the portion to the opposite polarity to the adjacent pole piece. Each pole piece (60,62) comprises a permanent magnet (68,70) with the permanent magnets disposed on opposite sides of the moveable portion (82b,102b) of the armature (82,102). The device may be configured to control the flow of fluids.

14 Claims, 6 Drawing Sheets

(56) References Cited

U.S. PATENT DOCUMENTS

| | | | |
|---|---|---|---|
| 3,457,955 A * | 7/1969 | Kleiner et al. | 137/625.44 |
| 3,532,121 A * | 10/1970 | Sciortino et al. | 137/625.4 |
| 4,225,835 A | 9/1980 | Vrsnak et al. | |
| 4,602,230 A | 7/1986 | Schedele | |
| 6,935,373 B2 * | 8/2005 | Wygnanski | 137/625.44 |
| 7,021,603 B2 * | 4/2006 | Wygnaski | 251/129.15 |

FOREIGN PATENT DOCUMENTS

| | | |
|---|---|---|
| DE | 35 28 090 C1 | 10/1986 |
| GB | 1 264 859 A | 2/1972 |
| GB | 2 342 504 A | 4/2000 |
| GB | 2 342 782 A | 4/2000 |
| GB | 2 380 064 A | 3/2003 |
| WO | 02/04851 A1 | 1/2002 |

OTHER PUBLICATIONS

United Kingdom Intellectual Property Office, Patents Act 1977: Search Report Under Section 17, Application No. GB1007458.1, dated Nov. 17, 2010 (1 page).

United Kingdom Intellectual Property Office, Patents Act 1977: Search Report Under Section 17, Application No. GB1102452.8, dated May 20, 2011 (1 page).

European Patent Office, International Search Report and Written Opinion of the International Searching Authority, International Application No. PCT/GB2011/050863, dated Aug. 16, 2011 (11 pages).

* cited by examiner

ELECTROMAGNETICALLY OPERATED SWITCHING DEVICES AND METHODS OF ACTUATION THEREOF

FIELD OF THE INVENTION

The present invention relates to electromagnetically operated switching devices and methods for the operation of such devices. More particularly, it is concerned with improving the magnetic structure of these devices. It is also directed at the provision of sealed fast flow switching devices.

BACKGROUND OF THE INVENTION

EP-A-1303719 (filed by the present applicant) describes an electromagnetically operated device of the form shown in present FIG. 1.

A linear armature 10 is sandwiched between two internal pole pieces 12, 14 which are themselves sandwiched between two permanent magnets 16, 18. Two external members 20, 22 extend beyond the end of the sandwich of magnets and at their remote ends provide two inwardly facing poles 24, 26.

The two internal pole pieces 12, 14 extend beyond the permanent magnets 16, 18 where they are surrounded by a coil former 30 on which a coil 32 is wound. Two cylindrical inserts 34, 36 are fitted in the poles 24, 26 and the opposed inner ends of the inserts define orifices 38, 40.

The armature can be deflected and a magnetic field induced by a current flowing in the coil 32. Depending on the direction of current flow in the coil, the armature will be attracted to the pole 26 and insert 36, as shown in solid outline in FIG. 1, or towards the other pole 24 and insert 34, as shown in dashed outline.

In the known configuration shown in FIG. 1, there are regions 40, 42 of significant magnetic flux leakage beyond the external dimensions of the device. These regions also extend horizontally around the device above and below the plane of the drawing.

This is likely to be problematic in applications where the device is surrounded by fluid, as there will be a risk of build up of magnetic debris in these regions potentially leading to flow impairment or even blockages. Furthermore, the flux leakage may interfere with the operation of other adjacent devices. Similarly, the device may be susceptible to the influence of external magnetic fields.

SUMMARY OF THE INVENTION

The present invention provides an electromagnetically operated device comprising:
  an armature comprising a magnetisable and moveable portion for displacement between two stable rest positions;
  two pole pieces disposed on opposite sides of the armature, wherein the pole pieces form poles of opposing polarity adjacent to the armature, and the armature is magnetically attracted to a respective pole piece in each of its stable rest positions; and
  a coil arranged to polarise the moveable portion of the armature when the coil is energised, such that the moveable portion of the armature is displaced from one stable rest position to the other by energising the coil so as to polarise the portion to the opposite polarity to the adjacent pole piece,
  wherein each pole piece comprises a permanent magnet with the permanent magnets disposed on opposite sides of the moveable portion of the armature.

The permanent magnets are aligned with the moveable portion of the armature. They are disposed along the direction of movement of the moveable portion of the armature. This configuration provides a more compact arrangement relative to the known device described above, as the permanent magnets are incorporated in the pole pieces on opposite sides of the moveable portion of the armature, instead of occupying additional space on the opposite side of the coil.

This magnet location also improves the linkage of flux from the magnets with the armature. The lines of flux from one permanent magnet to the other are formed in substantially straight paths therebetween, with the moveable portion of the armature located in these paths.

Each permanent magnet may be located adjacent to a respective stable rest position of the armature. In this configuration, the permanent magnets are able to exert a stronger magnetic holding force on the armature as they are provided on the same side of the coil as the armature (with respect to the axis of the coil). This is in contrast to the known arrangement discussed above, in which the permanent magnets are provided remotely from and laterally spaced from the direction of movement of the armature. Their flux is linked to the armature along an extended magnetic path via the external members 20, 22 and the inwardly extending poles 24, 26. In the present arrangement, a greater proportion of the magnetic flux generated by the permanent magnets is is linked across the gap in which the moveable portion of the armature is located, so that their flux is more efficiently concentrated in the region containing the moveable portion of the armature.

The device may include a magnetic flux container which extends circumferentially around the permanent magnets and the coil with respect to the axis of the coil, wherein a magnetic circuit comprising the armature, the container and a pole piece is formed when the moveable portion of the armature is in each of its stable rest positions.

The container therefore restricts flux leakage in radial directions relative to the coil axis, containing flux generated within the device and shielding the interior from external magnetic flux.

Preferably, the magnetic flux container also substantially extends over one or both ends of the device, relative to the axis of the coil. This arrangement provides a substantially magnetically sealed device with minimal flux leakage. The shielding effects of the container also serve to avoid the performance of the device being affected by external magnetic fields. In a preferred configuration, components of the device provide a magnetic flux container which substantially encloses the interior of the device to avoid flux leakage.

The container preferably forms the housing of the device which supports the components within it, providing a compact configuration. This results in a strong, well-protected mechanical construction without requiring an additional housing around the device.

The armature may comprise flexible material to facilitate movement of a moveable portion relative to the remainder of the armature. Alternatively, the armature may be rigid and the whole of the armature moves or pivots in operation of the device. Preferably, the armature is resiliently biased towards a location between its stable rest positions. This serves to assist acceleration of the armature from one rest position towards the other, thereby reducing the electrical energy required to shift the armature from one position to the other. To achieve this, the armature may comprise resilient material.

In some embodiments, the location to which the moveable portion is resiliently biased may be closer to one pole piece than the other, providing an unsymmetrical bistable operation. This affords a stronger holding force in one stable position relative to the other, which may be beneficial in some applications.

The device may define first and second fluid ports, with a respective port being closed when the moveable portion of the armature is in each of its stable rest positions. Thus, the device may be configured to operate as a fluid flow control device.

Preferably, each of the first and second ports is in fluid communication with a fluid path defined by a respective pole piece. Definition of fluid paths to the ports in this way achieves a more compact configuration for the device.

The device may define a third fluid port, with a fluid path between the third port and one of the first and second ports being defined by the device when the other of the first and second ports is closed.

At least part of the moveable portion of the armature may extend within the coil. This allows the length of the moveable portion to be greater than would otherwise be the case. This means that the range of travel of its distal end can be greater. A greater flow rate from each of the first and second ports may therefore be permitted as a result of the armature lying a greater distance away from the open port when in the stable rest position which closes the other port.

In a further embodiment, the moveable portion of the armature is pivotably coupled to a support within the device by a flexible coupling. The moveable portion of the armature is arranged to extend laterally over the support adjacent to the coupling. This provides an additional surface area for linkage of magnetic flux between the armature and the support. This wider magnetic path may be desirable in some configurations to avoid magnetic saturation.

Preferably, the armature extends into the support and the armature itself forms the flexible coupling between the moveable portion and a fixed portion held by the support. This provides a simpler construction relative to provision of a hinge for example.

The support may be provided by the magnetic core of the coil of the device.

BRIEF DESCRIPTION OF THE DRAWINGS

Embodiments of the invention will now be described by way of example and with reference to the accompanying schematic drawings wherein.

DETAILED DESCRIPTION OF THE INVENTION

Figure 1:
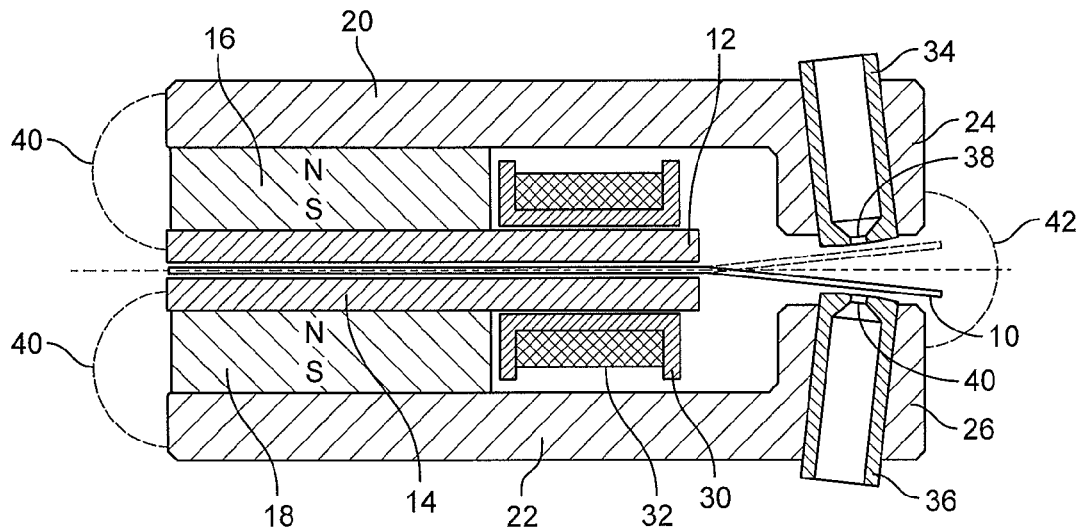
FIG. 1 is a cross-sectional side view of a known electromagnetically operated device.

It should be noted that the Figures are diagrammatic and not drawn to scale. Relative dimensions and proportions of these Figures have been shown exaggerated or reduced in size, for the sake of clarity and convenience in the drawings. The same reference signs are generally used to refer to corresponding or similar features in modified and different embodiments.

An electromagnetically operated device embodying the invention is depicted in FIGS. 2, 3A, 3B and 4. The device is housed in a container formed by container body 50 and an end cap 52. The container body is in the form of a hollow cylinder open at one end and having an end portion 53 at the other, with the open end engaged by end cap 52.

The container body is formed of a material having a high magnetic permeability. It may comprise ferromagnetic material. The end cap may also be formed of a high magnetic permeability material, so that a magnetic flux container is formed by the container body and end cap in combination which surrounds the interior of the device. Alternatively, in some applications the end cap may be formed from non-magnetic material, such as aluminium.

A coil 54 is mounted on the end portion 53 of the container body, coaxially with respect to the body. A coil core is provided centrally within the windings of the coil. The core is divided into two halves 56 and 58. The coil core may extend through the end portion 53 of the container body or be contained within it. The core extends axially inwards, partway through the coil.

A pair of pole pieces 60 and 62 are provided between the coil and the end cap. They extend radially inwards from the cylindrical wall of the container body to define opposing, spaced apart pole piece faces 64, 66. Each pole piece 60, 62 includes a ferromagnetic extension 65, 67, a permanent magnet 68, 70 and a ferromagnetic end piece 69, 71. Each ferromagnetic extension extends between the container body 50 and a respective magnet to space each magnet from the body and so reduce flux leakage to the exterior. The end pieces are carried by respective magnets and form is the pole piece faces. Each permanent magnet 68, 70, has its North and South poles aligned radially with respect to the central longitudinal axis 73 of the container, and they are orientated such that pole piece 60 forms a South pole at pole piece face 64 and pole piece 62 forms a North pole at pole piece face 66.

The end pieces 69, 71 are provided to protect the permanent magnets 68, 70 from mechanical wear during use of the device. They are preferably formed of a corrosion resistant material such as ferritic chromium steel (for example SS430 or XP13).

Figure 2:
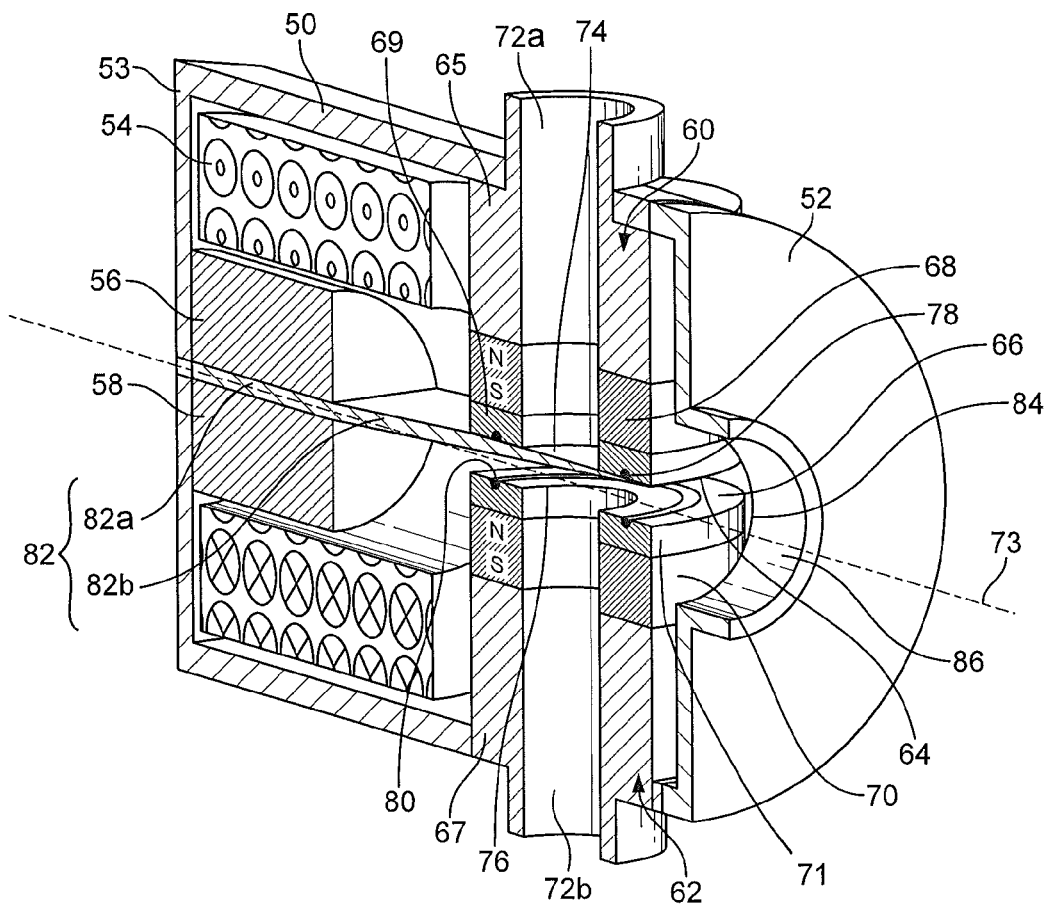
FIG. 2 is a cross-sectional perspective side view of an electromagnetically operated device in accordance with the present invention.

A non-magnetic end cap 52 is shown in FIG. 2, as the cap is relatively close to the magnets 68, 70 to reduce the axial length of the device. If the cap is spaced further away from the magnets 68, 70, so that the distance from the cap to the magnets is substantially greater than the length of the air gap between the pole end pieces 69, 71, the cap may comprise a material having a high magnetic permeability to form part of the magnetic flux container with the container body 50. Spacing the magnetic cap from the magnets in this manner sufficiently reduces internal flux leakage from one magnet to the other via the end cap, which otherwise lessens the amount of useable flux acting on a moving part of the armature.

Each pole piece defines a respective fluid path 72a, 72b therethrough, extending from the exterior of the device, through the container body wall, to first and second ports 74, 76 defined in the pole piece faces 64, 66. A resiliently compressible ring seal 78, 80 is provided in each pole piece face 64, 66 around each port 74, 76.

The ferromagnetic extensions 65, 67 may extend radially outwards through the container body 50 to form tubular portions defining fluid paths 72a, 72b beyond the container.

A laminar armature 82 extends along the axis of the device. A first portion 82a is fixed in position and sandwiched between the coil core pieces 56, 58. A second armature portion 82b extends into the device away from the coil cores, through and beyond the coil 54 and between the pole piece faces 64, 66. The armature is formed of a resilient, magnetisable material so that portion 82b is able to flex between one is end of its travel in which it is in contact with pole piece face 64 (and/or seal 78), and the other end of its travel in which it is contact with pole piece face 66 (and/or seal 80). The permanent magnets are located along the direction of movement of the armature. Preferably they are also in close proximity to the armature. These features improve the linkage of magnetic flux between the magnets and the armature.

The armature may comprise spring steel. For greater corrosion resistance, it may comprise ferritic chromium steel (for example SS430 or XP13).

Where appropriate, internal surfaces other than the engagement surfaces of the end pieces 69, 71 and the armature 82 are coated or sealed off in some way from fluids present in the interior of the device to prevent corrosion.

Figure 3A:
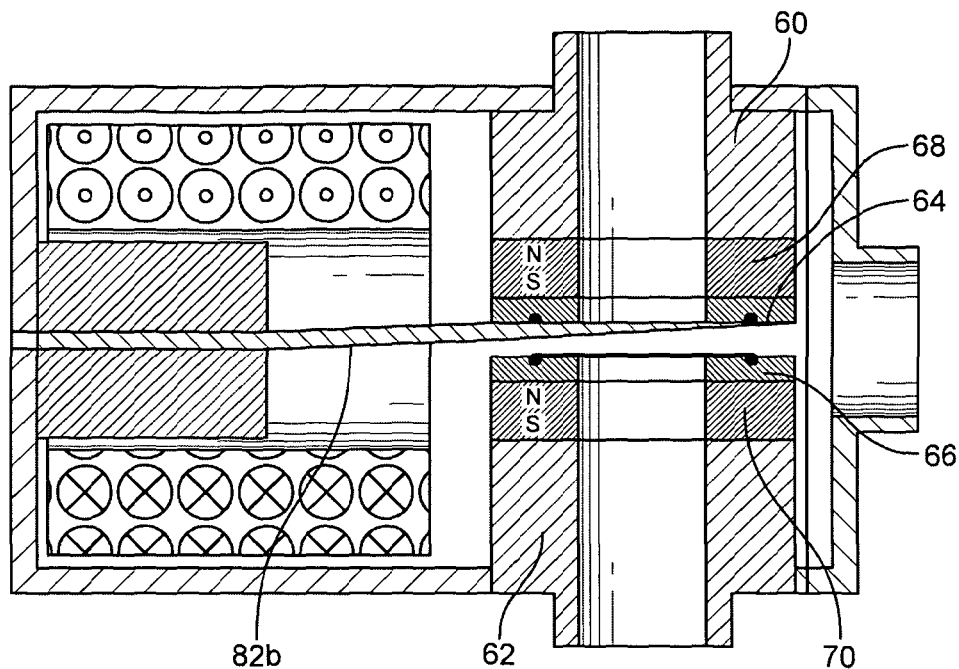
FIGS. 3A and 3B are cross-sectional side views of the actuator of FIG. 2, with its armature in each of its stable rest positions.
Figure 3B:
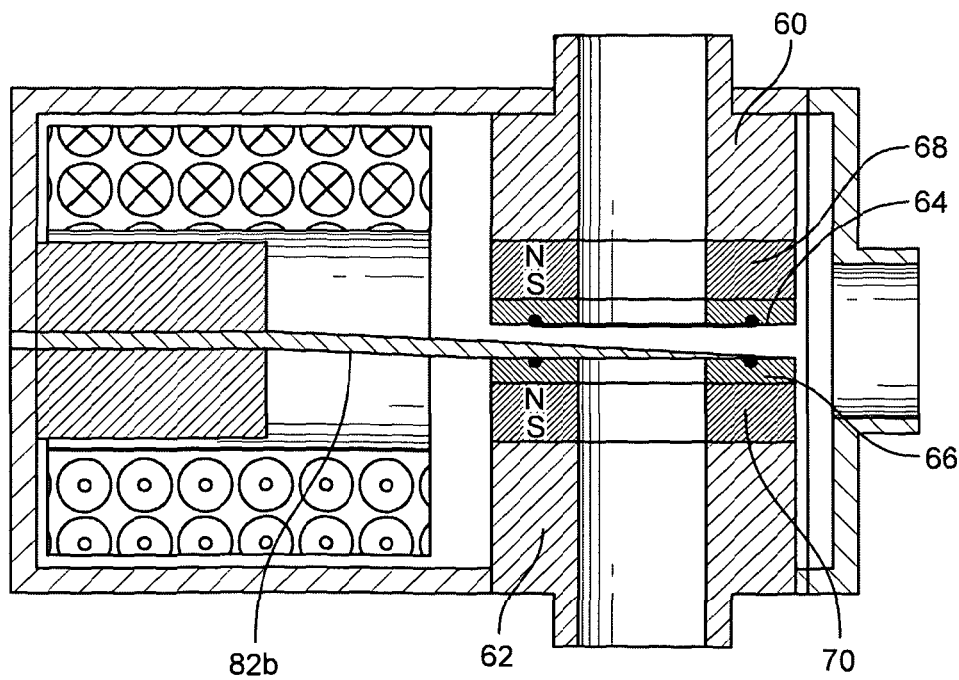

In the embodiment illustrated, the pole piece faces lie in parallel planes, and armature portion 82b is tapered such that its thickness decreases with increasing distance from the coil core so that in each end of travel position, it engages the respective pole piece face with a surface that is substantially parallel to the plane of the pole piece face, thereby closing off the respective port (see FIGS. 3A and 3B). Alternatively, the armature portion 82b may have parallel sides, with the pole pieces faces being angled or shaped so as to complement the profile of the armature portion in each end of its travel contact positions.

End cap 52 defines a third fluid port 84, in fluid communication with an end cap channel 86 which extends from port 84 to the exterior of the device.

The container body 50 extends continuously and circumferentially around the coil 54 and also circumferentially surrounds the magnets 68, 70. End portion 53 of the container body extends radially inwardly from one end of the cylindrical wall of the container body, over the outer end face of the coil 54, and meets or extends over the outer end of the coil core (56, 58).

In operation, the device is bistable. Its two stable rest positions are shown in FIGS. 3A and 3B. In FIG. 3A armature portion 82b is attracted to pole piece 60 by is permanent magnet 68. Application of a pulse of current to the coil 54 polarises the second portion 82b of the armature. In the case of FIG. 3A, if the direction of the current through the coil forms a South pole in the armature portion 82b, it is repelled by the South pole of permanent magnet 68, and attracted by the North pole of magnet 70. Thus, the armature portion 82b is switched from its stable rest position in engagement with pole piece face 64 to its other stable rest position, in contact with pole piece face 66, as shown in FIG. 3B.

The resilient nature of armature portion 82b encourages a rapid take-off action of the armature towards the other pole piece as soon as the magnetic attraction force is less than the mechanical spring force generated by the armature. This means that less electrical energy needs to be inputted into the coil in order to switch the device. A pulse length of less than 1 millisecond may be sufficient.

In each stable rest position, a closed magnetic circuit is formed by the armature, the coil core, the container body and one of the pole pieces. This serves to minimise flux leakage from the device.

The coil core extends only partway through the coil to accommodate a longer second armature portion 82b (in contrast to the known configuration shown in FIG. 1). This improves the trade-off between the range of travel of the armature between its stable rest positions and the amount of stress experienced by the armature as it flexes. With a longer travel, a higher flow rate is permitted via the ports 74, 76.

Figure 4:
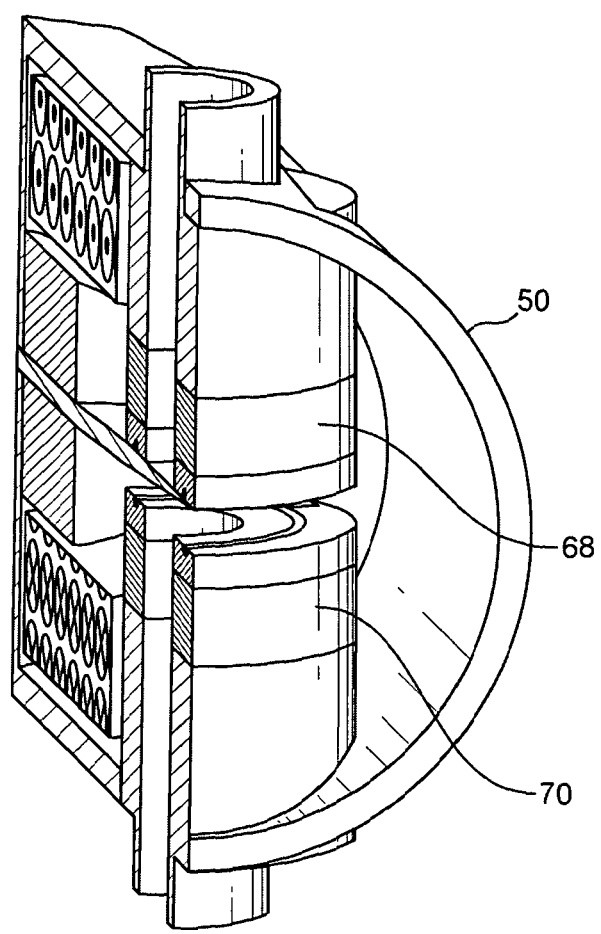
FIG. 4 is a cross-sectional perspective view of the device shown in FIG. 2 with its end cap removed.

It can be seen in FIG. 4 that the container body wall 50 is cylindrical where it extends between the pole pieces. This maintains a significant spacing between the container body wall and the permanent magnets 68, 70 and serves to reduce flux linkage from one magnet to the other via the container of the device.

It will appreciated that the device may be operated to control fluid flows in a number of ways by application of appropriate current pulses to the coil 54.

For example, it may be employed to selectively switch a high pressure supply connected to end cap port 84 to the first port 74 or second port 76. In another application, a high pressure supply connected to port 74 may be coupled to end cap port 84 by closing second port 76 with the armature. A load coupled to end cap port 84 may subsequently discharge fluid to second port 76 after the armature has been switched to close first port 74. In a further mode of operation, a high pressure supply coupled to end cap port may be connected to the first port 74, or vice-versa, whilst the armature closes off second port 76.

Figure 5A:
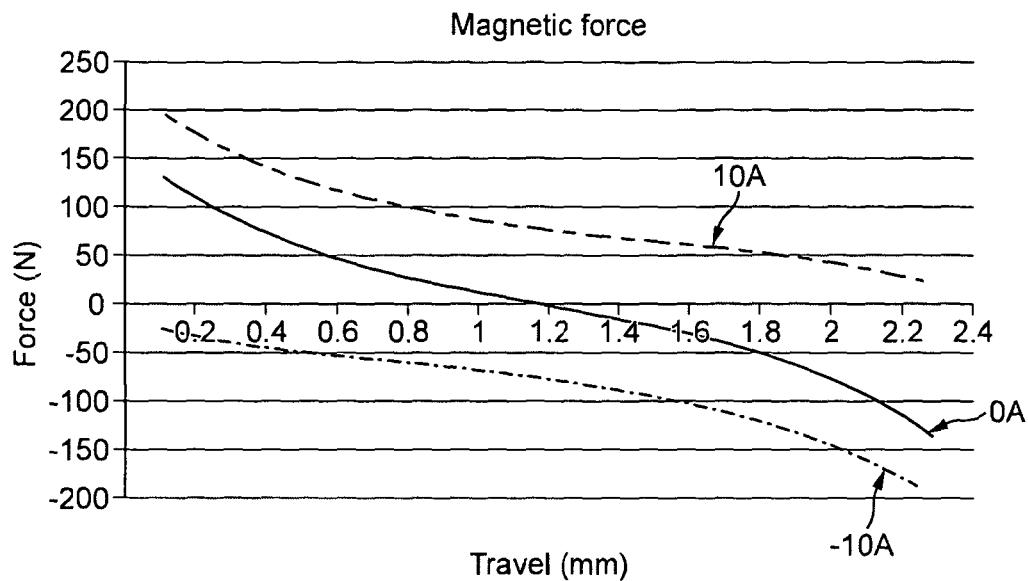
FIGS. 5A and 5B are graphs of magnetic force, and magnetic and flexure forces combined, respectively, as exerted on the device armature plotted against the position of the armature in its range of travel.
Figure 5B:
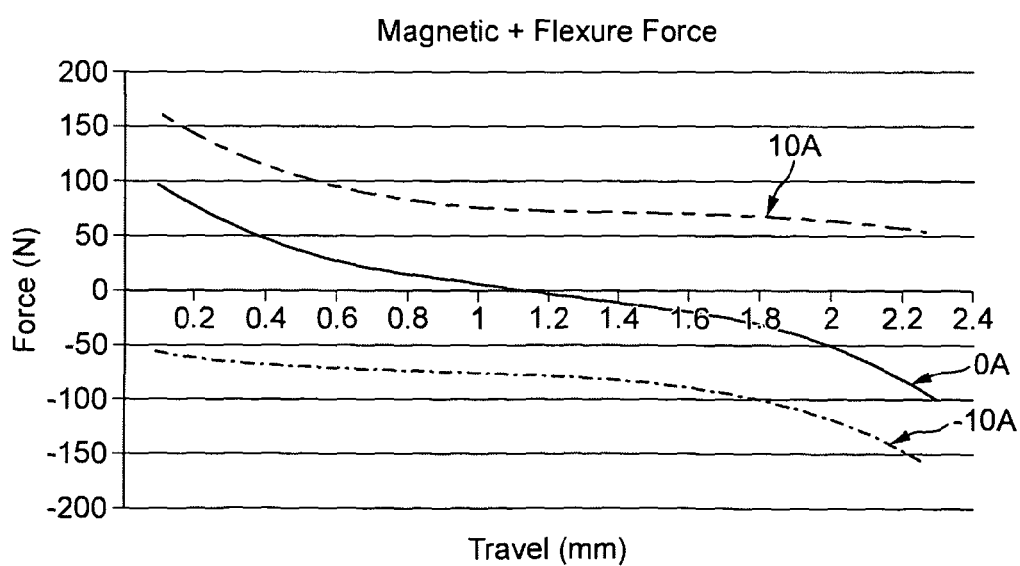

Forces acting on the armature over its range of travel are plotted in FIGS. 5A and 5B.

FIG. 5A shows only the magnetic forces acting on the armature. It can be seen that either side of the mid-point of its travel at 1.2 mm, the armature is biased towards one of the pole pieces as a result of the net force exerted by the permanent magnets 68, 70, giving its bistable characteristic. If a 10A pulse is applied to the coil in either direction (as shown by the dashed lines), it can be seen that the resultant force acting on the armature is sufficient to overcome the forces exerted by the permanent magnets at any position in its travel, and force the armature to one of its two stable rest positions.

In FIG. 5B, the effect of the flexure force resulting from the resilience of the armature is taken into account. It can be seen that this increases the magnitude of the resultant force experienced by the armature when a current pulse is applied to switch the armature from one stable rest position to the other.

The container configuration according to corresponding embodiments of the invention serves to effectively magnetically seal the device without the need for a separate housing for this purpose. The container also serves to pneumatically/hydraulically seal the interior.

The compact self-contained configuration allows use of the device as a "plug-in" valve, providing a space efficient multi-valve capability.

Figure 6:
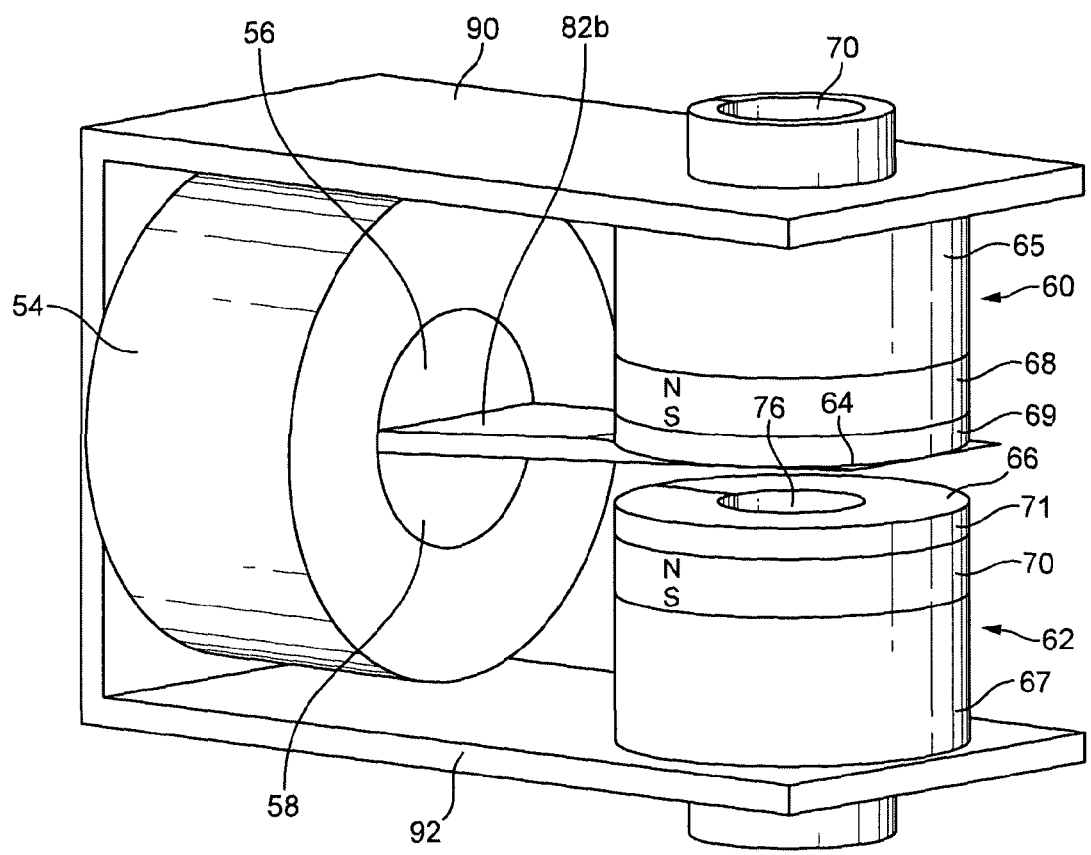
FIG. 6 is a perspective view of another embodiment of a device according to the invention.

FIG. 6 depicts another electromagnetically operated switching device in accordance with the present invention. Its structure and operation are similar to that of the embodiment described above in relation to FIGS. 2 to 5B. It differs in that it is not surrounded by a magnetic container which also pneumatically or hydraulically seals off the interior of the device.

The device of FIG. 6 has an open-sided construction. A magnetic return path via each permanent magnet back to the coil core 56, 58 is provided by a U-shaped support formed of ferromagnetic material. In the configuration shown in FIG. 6, the support is formed by two L-shaped supports 90, 92, one being the mirror image of the other. The U-shaped support may instead be fabricated in a single piece for example.

The pole pieces 60, 62 are mounted at one end of a limb of each of the supports 90, 92. The other limb of each support extends over the outer end face of the coil 54 and a respective coil core 56, 58. The cross-section of each support is large enough to provide a good magnetic return path, to substantially contain flux generated during operation of the device without saturating.

The device may be inserted into a separate fluidically sealed container. It provides a bistable valve able to withstand a positive or negative pressure difference between the interior of the device and the surrounding environment.

Figure 7:
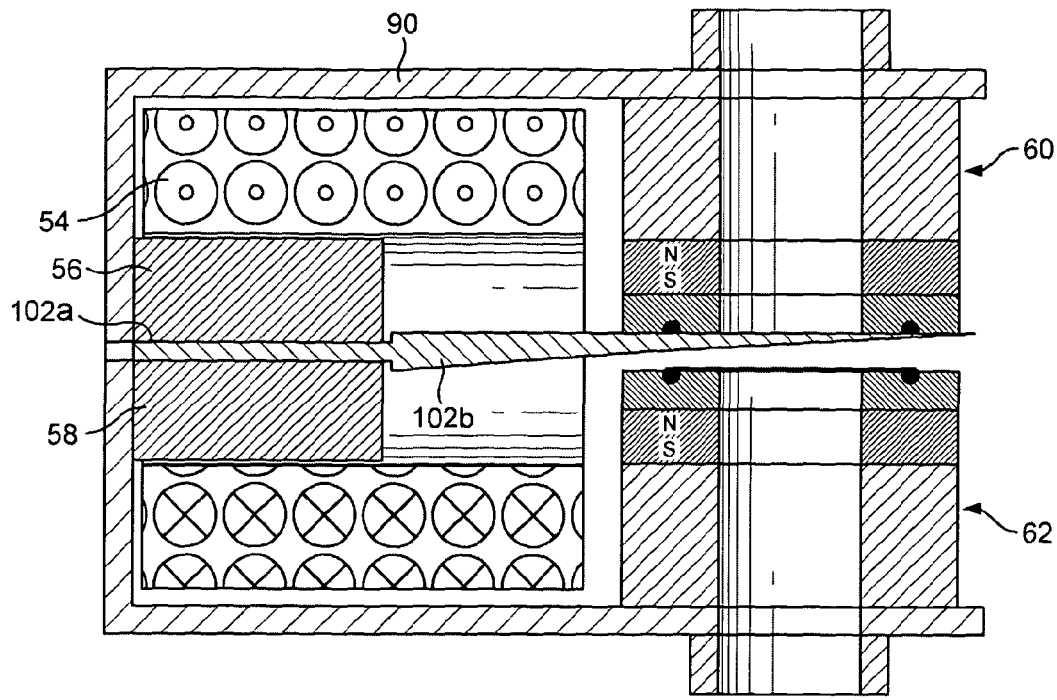
FIGS. 7 and 8 are cross-sectional side and perspective views, respectively, of a further embodiment of the invention.
Figure 8:
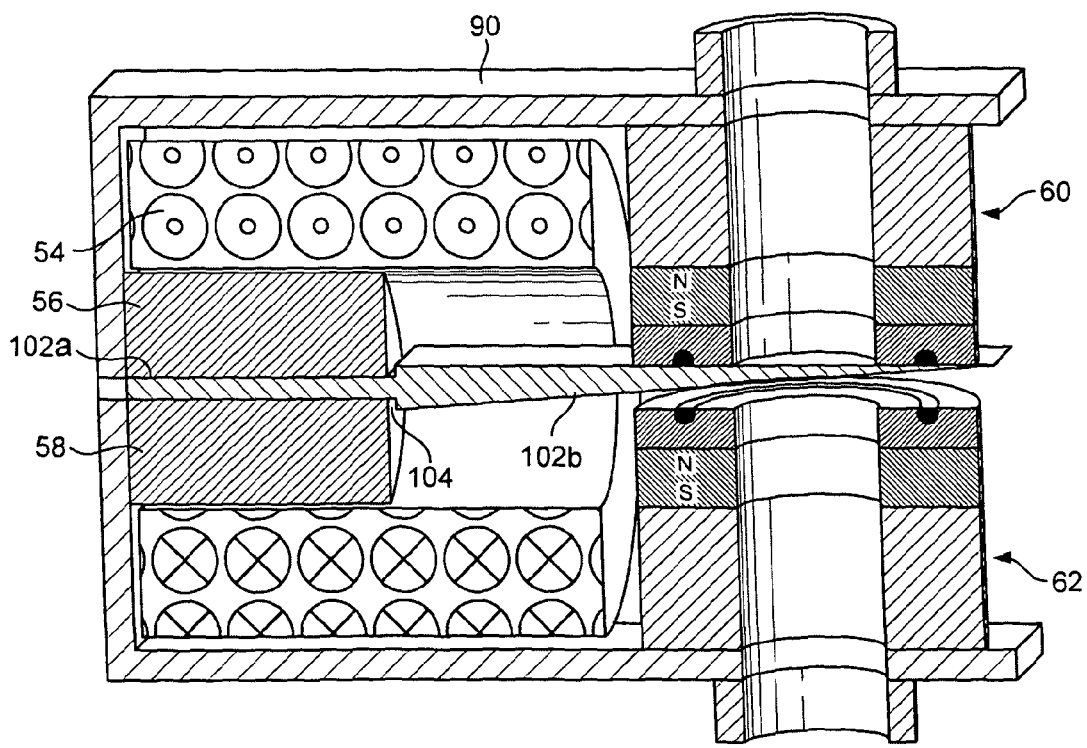

The embodiment depicted in FIGS. 7 and 8 is similar to that of FIG. 6, except that an alternative armature configuration is included. In FIG. 6, it can be seen that moveable portion 82b of the armature has a constant cross-section as it extends away from the coil cores 56, 58 and its end portion is tapered such that the thickness of the laminar armature decreases towards its distal end.

In some applications, magnetic saturation may occur during operation of the device due to the cross-section of the magnetic flux path provided by the armature where it meets the coil core being insufficient. This issue is addressed in the embodiment of FIGS. 7 and 8. It can be seen that the moveable portion 102b of the armature in this is embodiment has been modified so that it extends laterally over the end faces of the coil cores 56, 58 in close proximity to those faces. The thickness of the moveable portion of the armature is increased close to the coil cores, by increasing the dimension normal to the plane of the armature. Thus, the cross-sectional area of the laterally extended end of the moveable portion is significantly greater than that of the fixed portion of the armature. This presents a greater surface area for linkage of magnetic flux between the armature and the coil cores. Additional flux linkage occurs across the narrow gap 104 between the end faces of the coil cores 56, 58 and the opposed faces of the laterally extended armature portion 102b. This provides a wider magnetic flux path without compromising the flexibility of the armature, which is facilitated by the narrow neck portion that extends across gap 104. As shown in the Figures, the moveable portion 102b extends an equal distance either side of the neck portion. The thickness of the armature then tapers with increasing distance away from the coil cores to present opposed faces for engagement in parallel with the plane of a respective pole piece end face.

Gap 104 is configured to be wide enough to provide sufficient flexibility in the armature, whilst being narrow enough to provide for sufficient flux linkage across it from the armature into the coil cores.

The invention claimed is:

1. An electromagnetically operated device, comprising:
   an armature comprising a magnetisable and moveable portion for displacement between two stable rest positions;
   two pole pieces disposed on opposite sides of the armature, wherein the pole pieces form poles of opposing polarity adjacent to the armature, and the armature is magnetically attracted to a respective pole piece in each of its stable rest positions; and
   a coil arranged to polarise the moveable portion of the armature when the coil is energised, such that the moveable portion of the armature is displaced from one stable rest position to the other by energising the coil so as to polarise the portion to the opposite polarity to the adjacent pole piece,
   wherein each pole piece comprises a permanent magnet with the permanent magnets disposed on opposite sides of the moveable portion of the armature,
   wherein the coil has a magnetic core, and a support for the armature is provided by the core,
   and wherein the magnetic core extends only partway through the coil to accommodate a longer moveable armature position.

2. A device of claim 1, wherein the armature comprises flexible material to facilitate movement of its moveable portion.

3. A device of claim 1, wherein the moveable portion is resiliently biased towards a location between its stable rest positions.

4. A device of claim 3, wherein the location is closer to one pole piece than the other.

5. A device of claim 1 including a magnetic flux container extending circumferentially around the permanent magnets and the coil with respect to the axis of the coil, wherein a magnetic circuit comprising the armature, the container and a pole piece is formed when the moveable portion of the armature is in each of its stable rest positions.

6. A device of claim 5, wherein each pole piece includes a ferromagnetic extension portion which extends between the container and the permanent magnet of the pole piece so as to space the magnet from the container.

7. A device of claim 1, wherein the device defines first and second fluid ports, and a respective port is closed when the moveable portion of the armature is in each of its stable rest positions.

8. A device of claim 7, wherein each of the first and second ports is in fluid communication with a fluid path defined by a respective pole piece.

9. A device of claim 7, wherein the device defines a third fluid port, and a fluid path between the third port and one of the first and second ports is defined by the device when the other of the first and second ports is closed.

10. A device of claim 9, including a container which contains the armature, pole pieces and coil, the container being formed by a container body and an end cap, wherein the third fluid port is defined by the end cap.

11. A device of claim 1, wherein at least part of the moveable portion of the armature extends within the coil.

12. A device of claim 1, wherein:
    the moveable portion of the armature is pivotably coupled to a support by a flexible coupling; and
    the moveable portion of the armature extends laterally over the support adjacent to the coupling to provide an additional surface area for linkage of magnetic flux between the armature and the support.

13. A device of claim 1, wherein:
    the armature comprises flexible material to facilitate movement of its moveable portion;
    the moveable portion of the armature is pivotably coupled to a support by a flexible coupling;
    the moveable portion of the armature extends laterally over the support adjacent to the coupling to provide an additional surface area for linkage of magnetic flux between the armature and the support; and
    the armature extends into the support and the armature itself forms the flexible coupling.

14. An electromagnetically operated device, comprising:
    an armature comprising a magnetisable and moveable portion for displacement between two stable rest positions;
    two pole pieces disposed on opposite sides of the armature, wherein the pole pieces form poles of opposing polarity adjacent to the armature, and the armature is magnetically attracted to a respective pole piece in each of its stable rest positions; and
    a coil arranged to polarise the moveable portion of the armature when the coil is energised, such that the moveable portion of the armature is displaced from one stable rest position to the other by energising the coil so as to polarise the portion to the opposite polarity to the adjacent pole piece, wherein each pole piece comprises a permanent magnet with the permanent magnets disposed on opposite sides of the moveable portion of the armature,
wherein the moveable portion is resiliently biased towards a location between its stable rest positions,
and wherein the location is closer to one pole piece than the other.

* * * * *

UNITED STATES PATENT AND TRADEMARK OFFICE
CERTIFICATE OF CORRECTION

| | | |
|---|---|---|
| PATENT NO. | : 9,046,187 B2 | Page 1 of 1 |
| APPLICATION NO. | : 13/643813 | |
| DATED | : June 2, 2015 | |
| INVENTOR(S) | : Wladyslaw Wygnanski | |

It is certified that error appears in the above-identified patent and that said Letters Patent is hereby corrected as shown below:

In the Specification:

In column 2, line 27, change "permanent magnets is is linked across" to --permanent magnets is linked across--.

In column 4, line 36, change "and form is the pole piece" to --and form the pole piece--.

In column 5, line 8, change "is able to flex between one is end of its travel" to --is able to flex between one end of its travel--.

In column 5, line 10, change "in which it is contact with pole piece face" to --in which it is in contact with pole piece face--.

In column 7, line 20, change "the armature in this is embodiment has" to --the armature in this embodiment has--.

In the Claims:

In claim 1, column 7, line 67, change "armature position." to --armature portion.--.

Signed and Sealed this
Tenth Day of November, 2015

Michelle K. Lee
*Director of the United States Patent and Trademark Office*